United States Patent
Chow et al.

(10) Patent No.: US 7,925,126 B2
(45) Date of Patent: Apr. 12, 2011

(54) FIBER SENSING SYSTEM WITH SELF-DETECTION MECHANISM

(75) Inventors: Chi-Wai Chow, Hsinchu (TW); Sien Chi, Hsinchu (TW); Chia-Hsuan Wang, Jhuangwei Township, Yilan County (TW); Fu-Yuan Shih, Anding Township, Tainan County (TW); Chien-Hung Yeh, Banciao (TW)

(73) Assignee: National Chiao Tung University, Hsinchu (TW)

( * ) Notice: Subject to any disclaimer, the term of this patent is extended or adjusted under 35 U.S.C. 154(b) by 21 days.

(21) Appl. No.: 12/385,229

(22) Filed: Apr. 2, 2009

(65) Prior Publication Data

US 2010/0183258 A1 Jul. 22, 2010

(30) Foreign Application Priority Data

Jan. 20, 2009 (TW) ................ 98102033 A

(51) Int. Cl.
*G02B 6/10* (2006.01)
*H04J 1/16* (2006.01)
*G06F 15/16* (2006.01)
(52) U.S. Cl. ............ 385/12; 385/18; 398/2; 398/3; 370/223
(58) Field of Classification Search ............ 370/223; 398/2–3; 385/12
See application file for complete search history.

(56) References Cited

U.S. PATENT DOCUMENTS

| | | | |
|---|---|---|---|
| 5,920,410 A * | 7/1999 | Smith et al. ............ | 398/59 |
| 7,054,264 B2 * | 5/2006 | Mor ............ | 370/223 |
| 7,139,475 B1 | 11/2006 | Kim et al. | |
| 7,146,073 B2 | 12/2006 | Wan | |
| 7,715,363 B1 * | 5/2010 | Wiggins et al. ............ | 370/352 |

OTHER PUBLICATIONS

Y. Yu, L. Lui, H. Tam, W. Chung; Fiber-Laser-Based Wavelength-Division Multiplexed Fiber Bragg Grating Sensor System; IEEE Photonics Technology Letters, vol. 13, No. 7, Jul. 2001.

P.C. Peng, H.Y. Tseng, S. Chi; A Hybrid Star-Ring Architecture for Fiber Bragg Grating Sensor System; IEEE Phototonics Technology Letters, vol. 15, No. 9, Sep. 2001.

\* cited by examiner

*Primary Examiner* — Ryan Lepisto
*Assistant Examiner* — Eric Wong
(74) *Attorney, Agent, or Firm* — Rosenberg, Klein & Lee

(57) ABSTRACT

The present invention discloses a fiber sensing system with self-detection mechanism which utilizes a central office to control secondary ring architecture formed by fiber sensor, remote node and optical coupler primarily. The secondary ring architecture is connected serially to form a primary ring architecture. The central office has a tunable laser light source that can deliver the light source to the fiber sensor. Since the fiber sensor has reflective ability, all light source signal sent by the tunable laser light source will be detected and measured by the fiber sensor. Thus central office can detect all signals reflected by the fiber sensor and produce a spectrum for analyzing fault point locations. The present invention can greatly enhance survivability and sensing capacity of all fiber sensors, so that when a fault point caused by environmental change within the fiber, it will not effect the overall operation of the sensing mechanism. The application of fiber sensor can also reduce cost and complexity of the overall fiber network topology.

13 Claims, 7 Drawing Sheets

FIBER SENSING SYSTEM WITH SELF-DETECTION MECHANISM

BACKGROUND OF THE INVENTION

1. Field of the Invention

The present invention relates to a fiber network system, particularly to a fiber sensing system with self-detection mechanism that is able to detect fiber network system and enhance overall transmission reliability of a network.

2. Description of the Related Art

In recent years, Fiber Bragg Grating (FBG) has become an important element in the field of optical sensing. Among the sensing system that using FBG primarily, the ability of providing diversified division multiplexing is one of most important characteristic for those sensing systems. FBG within the applications of division multiplexing includes wavelength-division multiplexing (WDM), space-division multiplexing (SDM), time-division multiplexing (TDM), code-division multiple access (CDMA), strength wavelength-division multiplexing and frequency-modulated continuous-wave (CW) multiplexing. Based on the existing division multiplexing technology and their ability to combine with each other, long range FBG sensing system can be easily manufactured. Therefore, how to enhance reliability and survivability of the FBG sensing system becomes an important issue recently. In general, network using architecture such as bus (in-line) topology, tree (star) topology and ring topology is unable to provide protection function to the sensing system. For instance, when a fault point appears on a fiber line with bus topology, the fiber sensor is no longer able to provide any sensing for any part of the fiber line after the fault point. In order to maintain the survivability of the FBG sensing system and operation of sensing mechanism to avoid the situation caused by environmental issue such as the fault point, it is essential to create a self-restored mechanism within the actual fiber sensing application.

In the paper "J. Lightwave Technol (2001), p 32" proposed by W. P. Lin, it mentioned a sensing architecture that combined the tree topology and the ring topology. Then in 2003, P. C. Peng added a self-restored mechanism to the sensing architecture mentioned above and the experiment result was proposed in the paper "IEEE Photon. Technol. Lett. vol. 15 (2003), p. 1270." However, such self-restored mechanism for the sensing network requires an additional active component on every remote node (RN) of the network, making the topology of the whole fiber network more complex and also increases the manufacture cost of the network. If there is a simpler FBG multi-ring fiber sensing system that has an ability of self protection (restoration), it would be able to solve many problems when multi-ring architecture network encounters disconnection. Such self-restoration mechanism can be executed quickly and provide users with wider and higher range of reliability, thus decrease production and maintenance cost of the network.

To overcome the abovementioned problem, the present invention proposes a novel fiber sensing system with self-detection mechanism that is able to overcome the obstacles encountered by the prior arts.

SUMMARY OF THE INVENTION

The primary objective of the present invention is to provide a fiber sensing system with self-detection mechanism which uses tunable laser as source of light in order to provide better reliability for wide-range sensing system. When there is an error occurred within the network connection architecture, the self-detection mechanism will execute sensing and restoration mechanism immediately.

Another objective of the present invention is to provide a fiber sensing system with self-detection mechanism that can greatly enhance survivability and sensing capacity of all fiber sensors, so that when a fault point caused by environmental change within the fiber, it will not effect the overall operation of the sensing mechanism. The application of fiber sensor can also reduce cost and complexity of the overall fiber network topology.

In order to realize objectives mentioned above, the fiber sensing system with self-detection mechanism of the present invention comprises a primary ring architecture and a central office. The primary ring architecture is formed by multiple secondary ring architectures which are connected to each other serially to form a primary loop. The secondary ring architecture includes at least two fiber sensors which can receive and reflect light source signal and a remote node. The remote node has an optical coupler which allows the light source signal to pass the fiber sensor to form a secondary loop, additionally the remote node can connect to adjacent secondary ring architectures. The primary function of central office is to provide and monitor the light source signal. The central office also has an optical switch wherein the optical switch has two outputs that connect to the primary ring architecture, forming a first path and a second path respectively. The optical switch can switch the traveling of the light source signal between the first path and the second path. The central office also comprises a tunable laser light source and an optical circulator, where the tunable laser light source emits the light source signal to the optical switch through the optical circulator, the optical switch can then switch the path of the light source signal to either first path or second path. The central office further includes an optical spectrum analyzer which is connected to the optical circulator. The fiber sensor mentioned above is Fiber Bragg Grating (FBG). The tunable laser light source is first dispersed into multi-light source and delivered to each remote node, then to the fiber sensor through the optical coupler on the remote node. Since the fiber sensor has reflective ability, all light source signal sent by the tunable laser light source will be detected and measured by the fiber sensor. If there is no fault point on the primary ring architecture and the secondary ring architecture, central office can detect all signals reflected by the fiber sensor. The fiber sensing system with self-detection mechanism of the present invention utilizes central office to control the secondary ring architecture formed by the fiber sensor, the remote node and the optical coupler primarily, the secondary ring architecture is connected serially to form a primary ring architecture. The central office has a tunable laser light source, the tunable laser light source is first dispersed into multi-light source and delivered to each remote node, then to the fiber sensor through the optical coupler on the remote node. Since the fiber sensor has reflective ability, all light source signal sent by the tunable laser light source will be detected and measured by the fiber sensor. If there is no fault point on the primary ring architecture and the secondary ring architecture, central office can detect all signals reflected by the fiber sensor and produce a spectrum. Not only does the present invention provides wider-range and multi-point detection, it also greatly reduce the manufacture cost of the optical network.

Below, the embodiments are described in detail in cooperation with the attached drawings to make easily understood the objectives, technical contents, characteristics and accomplishments of the present invention.

DETAILED DESCRIPTION OF THE INVENTION

Figure 1:
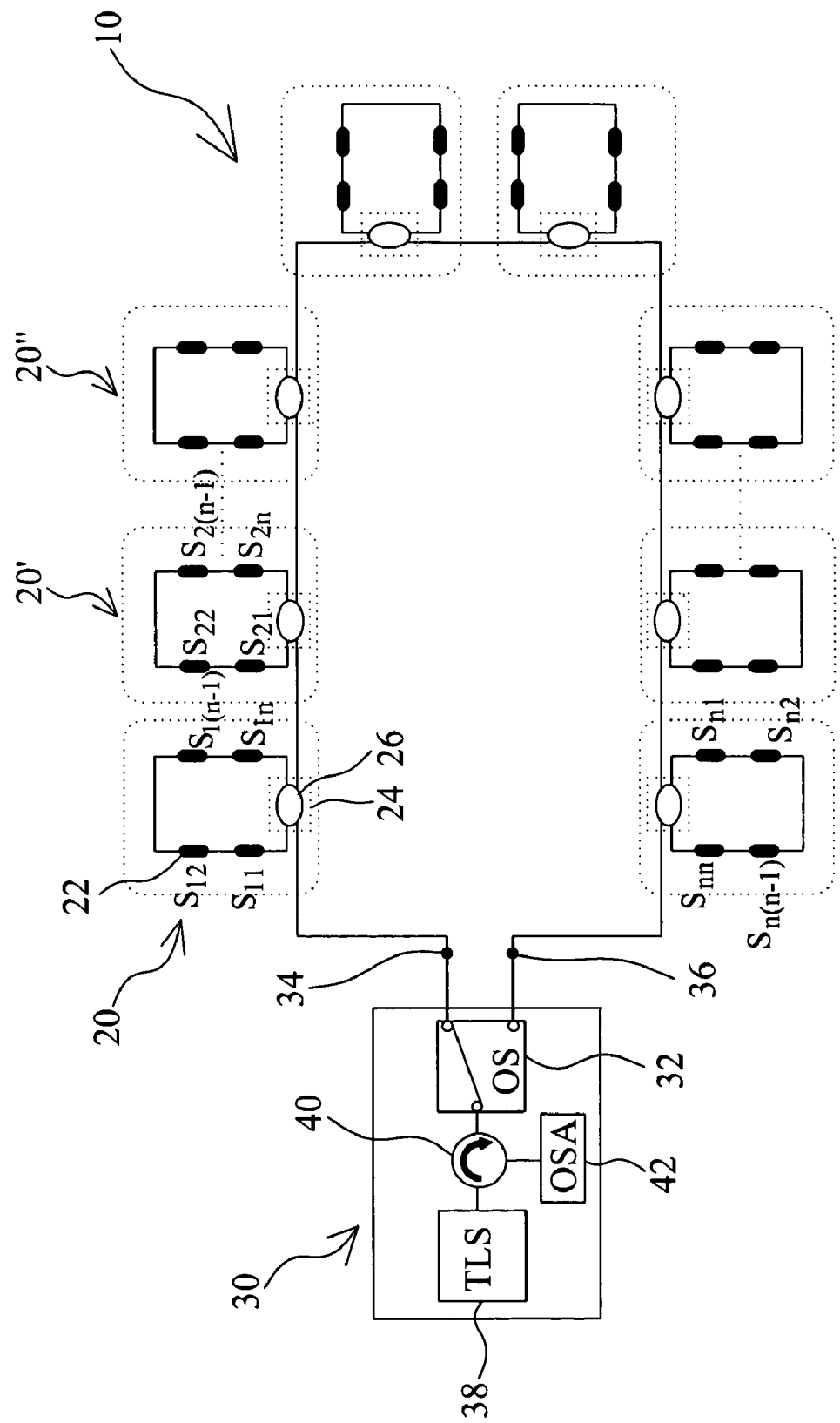
FIG. 1 is a diagram schematically showing the system architecture of the present invention.

FIG. 1 is a diagram schematically showing the system architecture of the present invention, as the figure shows, the present invention is a fiber sensing system with self-detection mechanism, primarily comprises a primary ring architecture 10 and a central office 30. The primary ring architecture 10 is formed by multiple secondary ring architectures 20 which are connected to each other serially to form a primary loop. The secondary ring architecture 20 includes at least two fiber sensors 22 (the following will use $S_{11}, S_{12}, S_{21}, S_{22}, S_{31}$ ... etc to denote each fiber sensor) which can receive and reflect light source signal and a remote node 24. The remote node has an optical coupler 26 which allows the light source signal to pass the fiber sensor 22 to form a secondary loop, additionally the remote node 24 can connect to adjacent secondary ring architectures. Suppose the primary ring architecture 10 has m secondary ring architecture 20 and each secondary ring architecture 20 has n fiber sensor 22. If every remote node 24 uses a 2×2 optical coupler 26 which makes the fiber sensor 22 to form a loop and connects to adjacent secondary ring architecture such as 20' and 20" through remote node 24, the system will have m×n sensors. The primary function of central office 30 is to provide and monitor the light source signal. The central office 30 also has an optical switch 32 wherein the optical switch 32 has two outputs that connect to the primary ring architecture 10, forming a first path 34 and a second path 36 respectively. The optical switch 32 can switch the traveling of the light source signal between the first path 34 and the second path 36. The central office 30 also comprises a tunable laser light source 38 and an optical circulator 40, where the tunable laser light source 38 emits the light source signal to the optical switch 32 through the optical circulator 40, the optical switch 32 can then switch the path of the light source signal to either first path 34 or second path 36. The central office 30 further includes an optical spectrum analyzer 42 which is connected to the optical circulator 40. The fiber sensor 22 of the present invention mentioned above is Fiber Bragg Grating (FBG) and the tunable laser light source 38 of the present invention can be a tunable erbium-fiber laser or any kind of laser light source.

Figure 2:
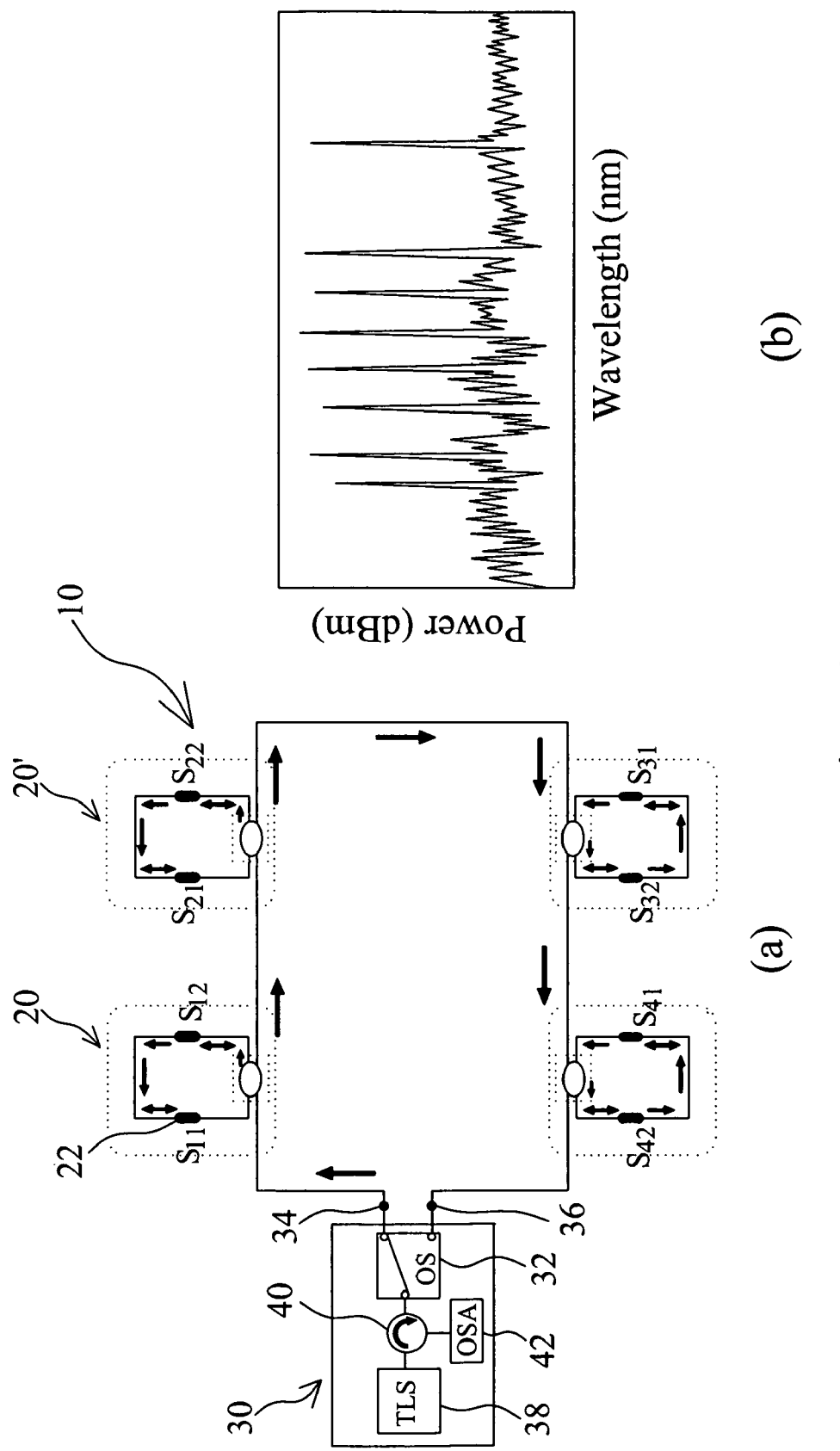
FIG. 2(a) is a diagram schematically showing system test of the present invention.
FIG. 2(b) is a diagram schematically showing spectrum result of the system test of the present invention which has no fault point.

FIG. 2(a) is a diagram schematically showing system test of the present invention. In one of the embodiments, a simple experiment was set up to analyze the fiber sensing system with self-detection mechanism. Suppose m and n is 4 and 2 respectively, which means there are total of eight fiber sensor 22 installed in this architecture, in addition, each fiber sensor 22 is being used as a reflective component. All light signal with different wavelength emitted by the tunable laser light source 38 within the central office 30 will all be detected by the fiber sensor 22. The Bragg wavelengths for those eight FBGs are 1526.63, 1528.87, 1532.64, 1536.57, 1538.24, 1541.88, 1545.83 and 1555.85 nm respectively. In addition, when there an external stress and temperature interferes with the Bragg wavelength of the fiber sensor 22, the sensing system of the present invention can still measure the wavelength accurately. Under normal circumstances, optical switch 32 is connected to the first path 34, so that all lasing wavelength from central office 30 will detect all fiber sensor 22 through the first path 34. The arrow sign in the figure represents sensing path of the whole sensing system from the first path 34 when there is no fault point; If the fiber sensor 22 is being assigned relative numbers from fiber sensor $S_{11}$ to fiber sensor $S_{42}$, the signal spectrum from tunable laser light source 38 which is being reflected from fiber sensor $S_{11}$ to fiber sensor $S_{42}$ can produce spectrum diagram like FIG. 2(b). FIG. 2(b) is a diagram schematically showing spectrum result of the system test of the present invention which has no fault point, as the figure shows, when there is no fiber fault point in the system, the central office 30 can completely detect all reflected signals generated by the eight fiber sensors.

In the sensing system of the preferred embodiment, there are primary three places which fault point may occur within the fiber network, those places are connection fiber of primary ring architecture 10, connection fiber of secondary ring architecture 20 or fiber sensor 22 itself, the following paragraph will analyze and discuss these three types of fault point and how the present invention can provide relative self protection mechanism when they occurs.

Figure 3:
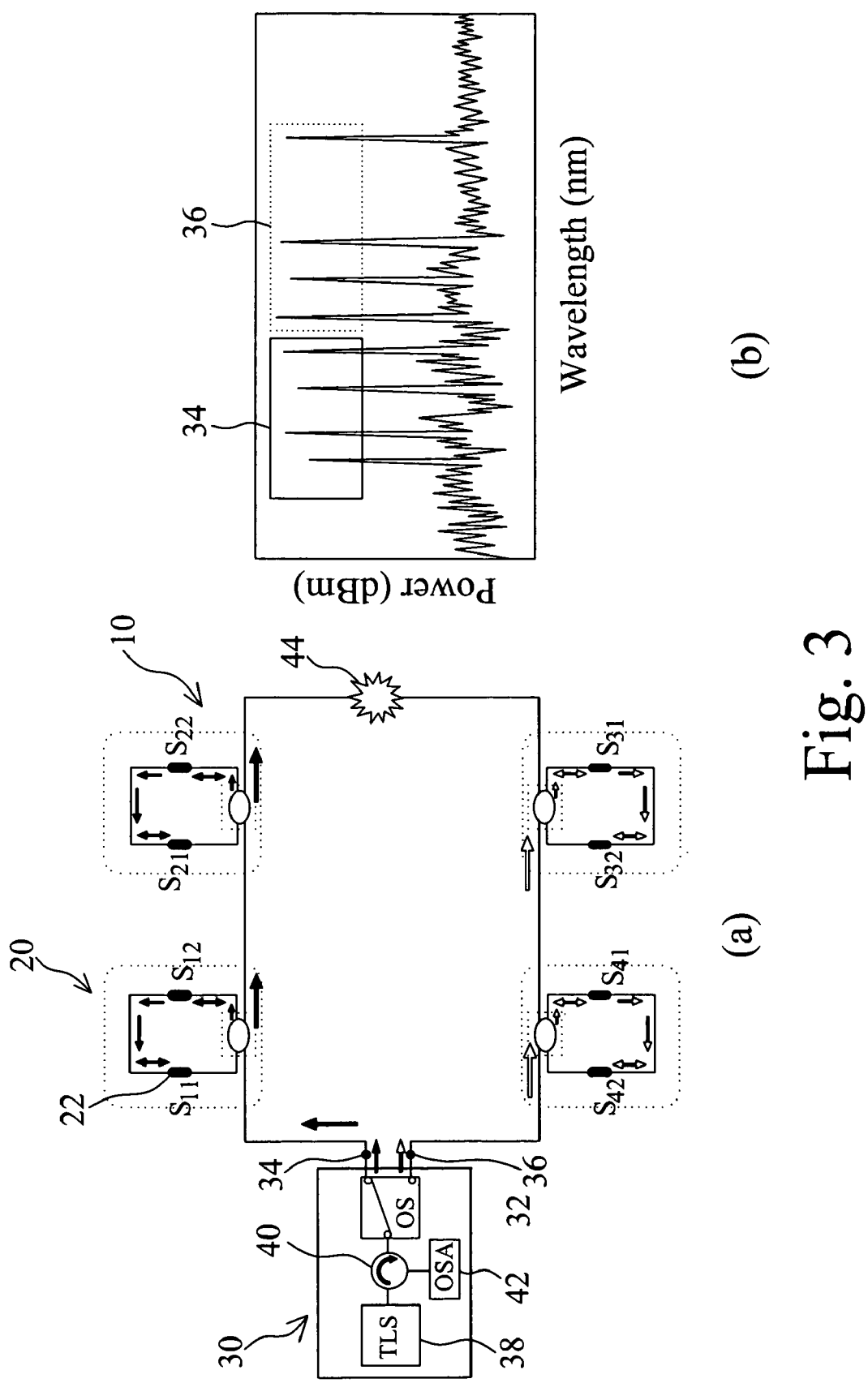
FIG. 3(a) is a diagram schematically showing system test of the present invention that has a fault point on the primary ring architecture.
FIG. 3(b) is a diagram schematically showing spectrum result of the system test of the present invention which has fault point.

FIG. 3(a) is a diagram schematically showing system test of the present invention that has a fault point on the primary ring architecture, as the figure shows, a fault point 44 occurs between fiber sensor $S_{22}$ and fiber sensor $S_{31}$ on the primary ring architecture 10. The original sensing signal sent out from first path 34 (denoted by solid arrow sign in the figure) will only sense fiber sensor $S_{11}$, fiber sensor $S_{12}$, fiber sensor $S_{21}$ and fiber sensor $S_{22}$. In order to detect the rest fiber sensor 22 signals, optical switch 32 will automatically switch the sensing path to second path 36 (denoted by hollow arrow sign in the figure). The system will then use the second path 36 to proceed sensing to the fault point 44 and sense out the rest of signals. The location of fault point 44 can be more clearly seen from the spectrum as FIG. 3(b) shows. FIG. 3(b) is a diagram schematically showing spectrum result of the system test of the present invention which has fault point, wherein solid lines represent signals detected by the first path 34 and dotted lines represents signals detected by the second path 36. Referred 3(b) to 3(a) at same time, since first path 34 (denoted by solid arrow sign in the figure) can not detect any signal beyond fiber sensor $S_{22}$ and second path 36 (denoted by hollow arrow sign in the figure) can not detect any signal before fiber sensor $S_{31}$, from the information given above, the system can determine that the location of the fault point is between fiber sensor $S_{22}$ and fiber sensor $S_{31}$. As a result, the fiber sensing system with self-detection mechanism mentioned above not only is able to protect the primary ring architecture 10 from problems caused by the broken fiber, it can also detect approximate fault point location.

Figure 4A:
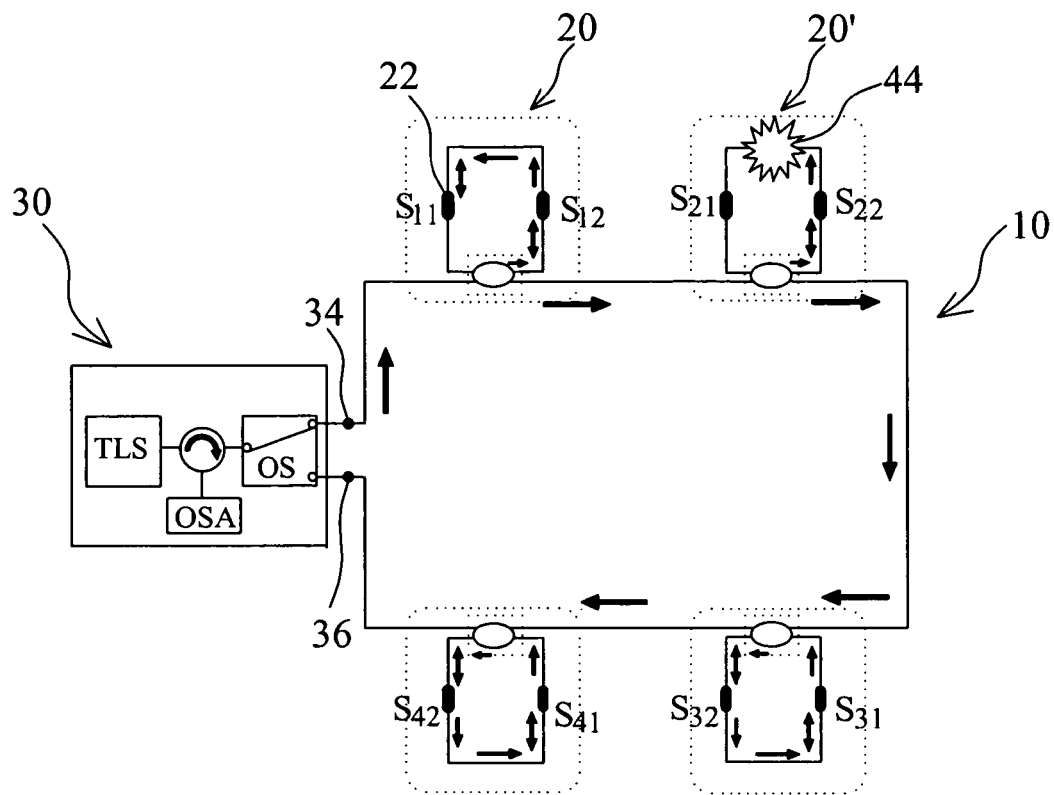
FIG. 4(a) is a diagram schematically showing system test of the present invention that has a fault point on the secondary ring architecture.
Figure 4B:
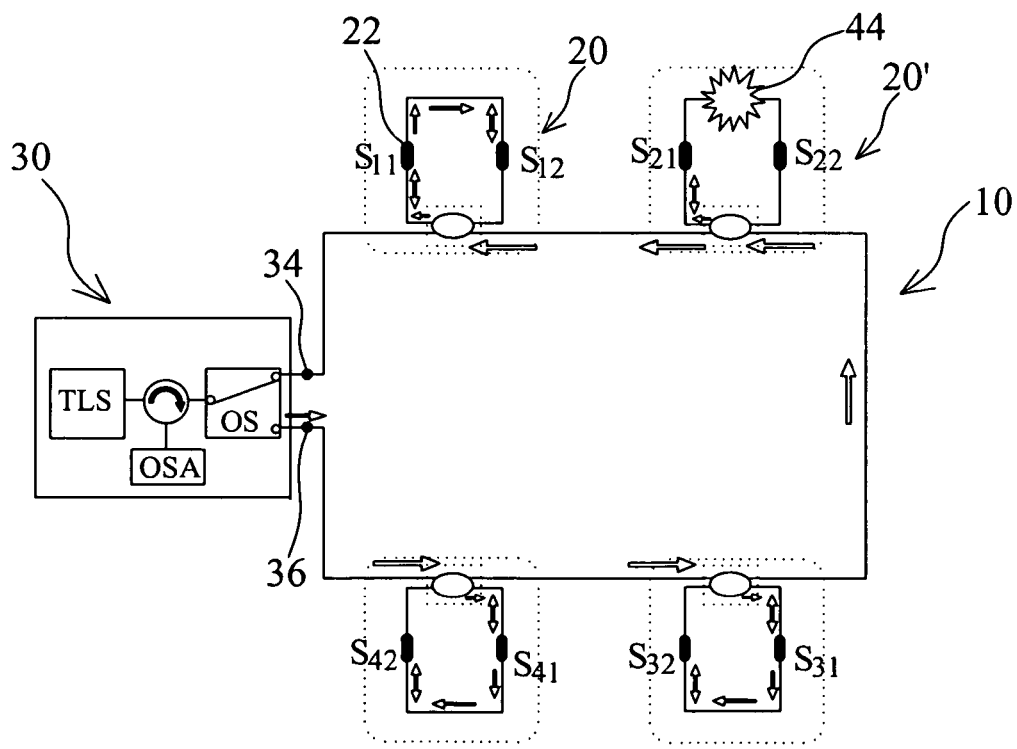
FIG. 4(b) is a diagram schematically showing system test of the present invention that has a fault point on the secondary ring architecture.
Figure 4C:
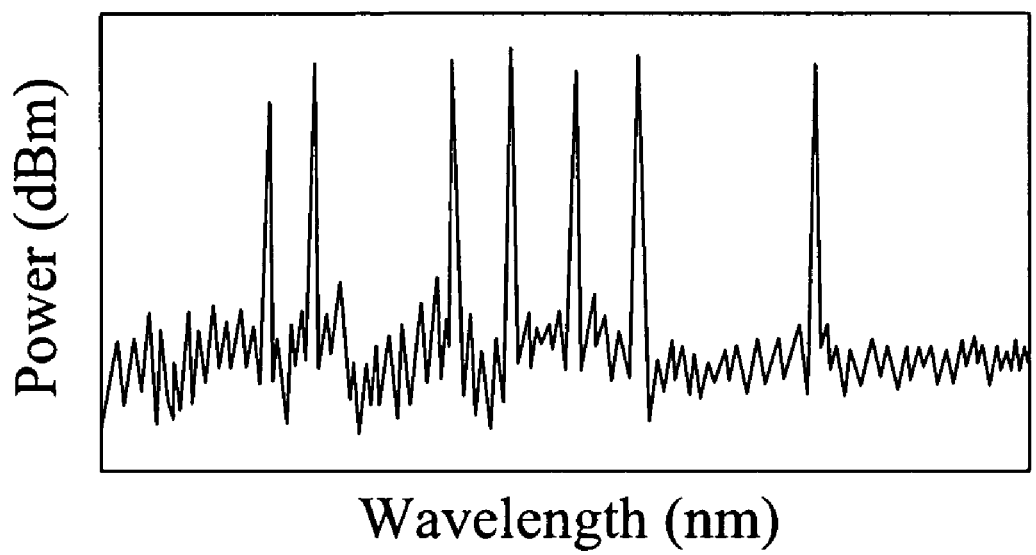
FIG. 4(c) is a diagram schematically showing spectrum result of the system test of the present invention which has fault point.
Figure 4D:
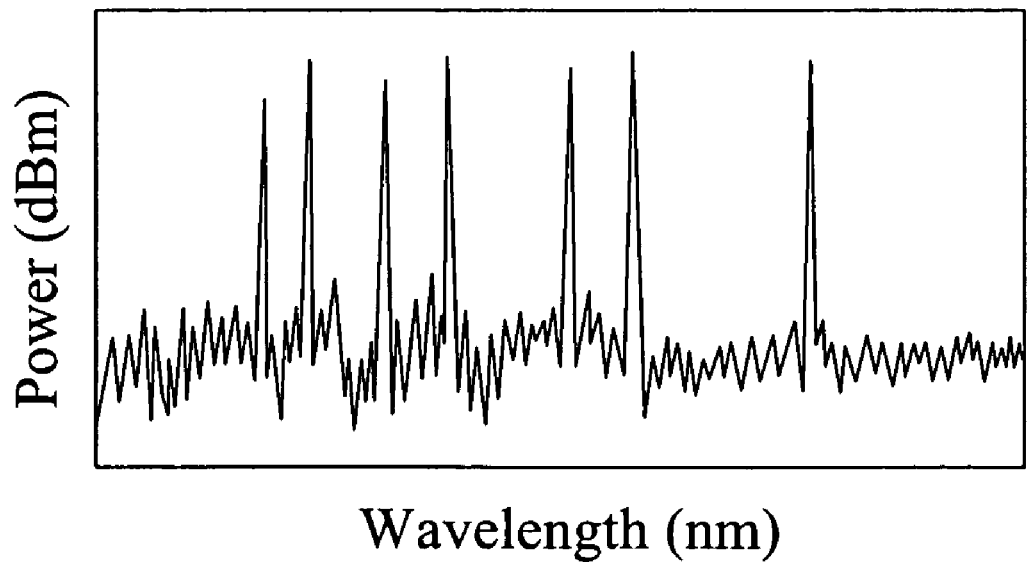
FIG. 4(d) is a diagram schematically showing spectrum result of the system test of the present invention which has fault point.

Both FIGS. 4(a) and 4(b) are diagrams schematically showing system test of the present invention that has a fault point on the secondary ring architecture. When sensing uses first path 34 (denoted by solid arrow sign in the figure) to proceed transmission, as FIG. 4(a) shows, if a fault point 44 occurs between fiber sensor $S_{21}$ and fiber sensor $S_{22}$ on the secondary ring architecture 20', the first path 34 will unable to detect signal of fiber sensor $S_{21}$, which make central office 30 to switch to second path 36 (denoted by hollow arrow sign in the figure). As FIG. 4(b) shows, central office 30 receives all reflected signals and produces sensing spectrum, in addition, central office 30 has already opened second path 36. Both FIGS. 4(c) and 4(d) both are diagrams schematically showing spectrum result of the system test of the present invention which has fault point. Compare the spectrum diagram produced from first path 34 on FIG. 4(c) with the spectrum diagram produced from second path 36 on FIG. 4(d), because first path 34 is unable to detect signal of fiber sensor $S_{21}$ and second path 36 can not detect signal of fiber sensor $S_{22}$, the system is thus able to determine that the location of the fault point 44 is between fiber sensor $S_{21}$ and fiber sensor $S_{22}$.

Figure 5A:
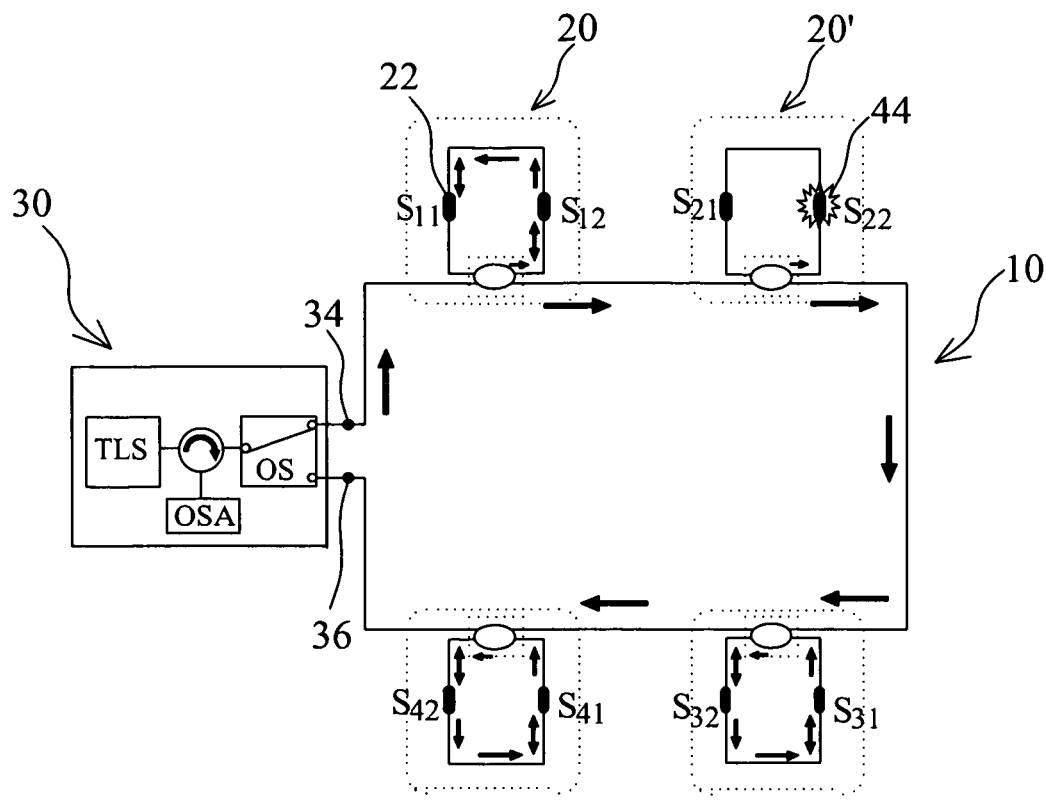
FIG. 5(a) is a diagram schematically showing system test of the present invention that has a fault point on the fiber sensor.
Figure 5B:
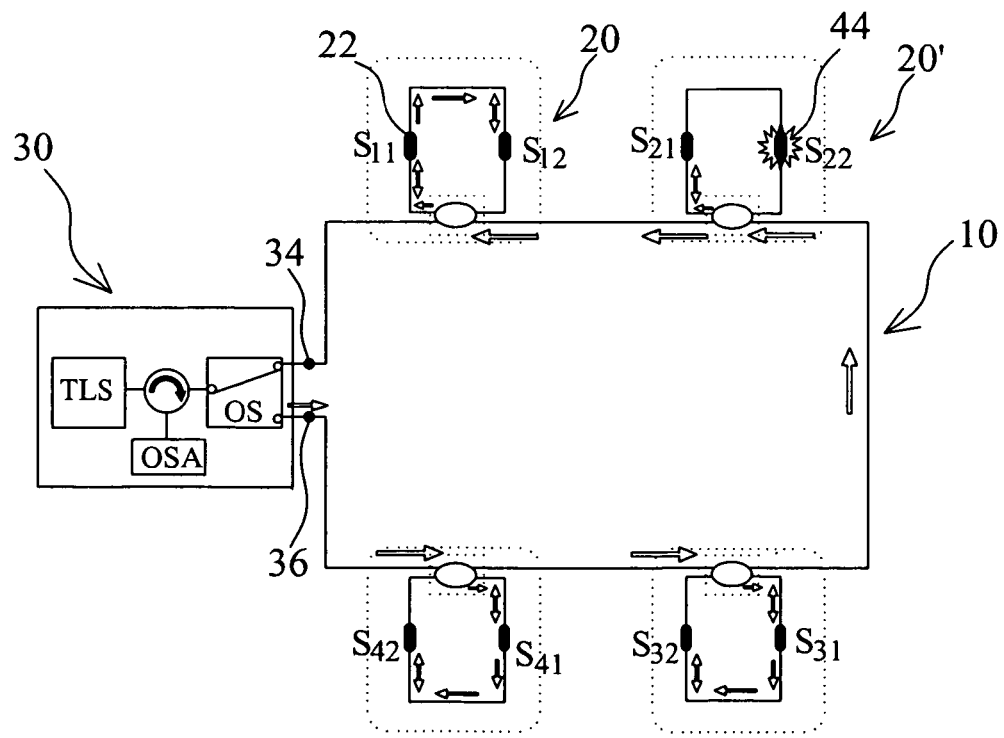
FIG. 5(b) is a diagram schematically showing system test of the present invention that has a fault point on the fiber sensor.
Figure 5C:
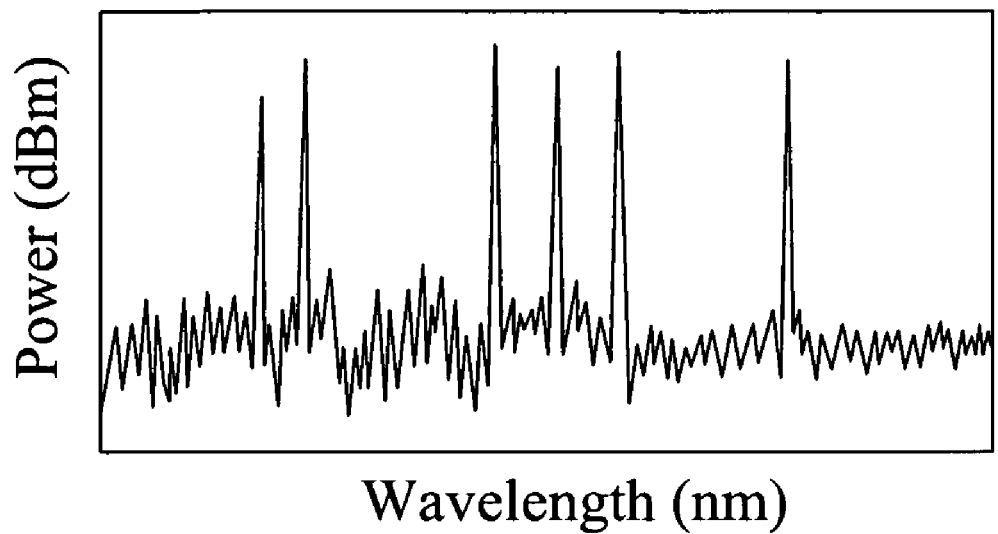
FIG. 5(c) is a diagram schematically showing spectrum result of the system test of the present invention which has fault point.
Figure 5D:
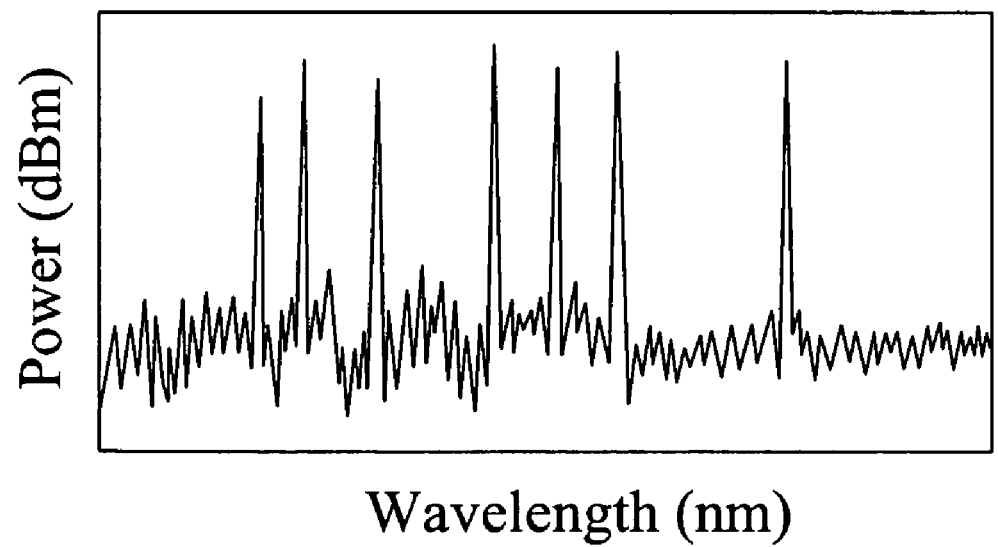
FIG. 5(d) is a diagram schematically showing spectrum result of the system test of the present invention which has fault point.

Both FIGS. 5(a) and 5(b) are diagram schematically showing system test of the present invention that has a fault point on the fiber sensor. If stress or temperature around fiber sensor 22 changes due to environmental change or human error, it may shift the Bragg wavelength of the sensor. When those changes exceed the maximum limit which the fiber sensor 22 can tolerate; it will cause fiber sensor 22 to break. The sensing system of the present invention can also detect fault point in the situation like this. As FIG. 5(a) shows, when sensing uses first path 34 (denoted by solid arrow sign in the figure) to proceed transmission, if fiber sensor $S_{22}$ itself is broken, it will produce a sensing spectrum like FIG. 5(c). Both FIGS. 5(c) and 5(d) are diagram schematically showing spectrum result of the system test of the present invention which has fault point. In FIG. 5(c), since fiber sensor $S_{22}$ within the first path 34 is broken, signals from fiber sensor $S_{22}$ and fiber sensor $S_{21}$ will be unable to be detected. Back to FIG. 5(a), in order to regain the two missing signals, central office 30 will automatically switch to second path 36 (denoted by hollow arrow sign in the figure) as FIG. 5(b) shows. Compare two paths from FIGS. 5(c) and 5(d) now, it can be seen that signal of fiber sensor $S_{22}$ is missing from the spectrum diagram of the second path, thus the system is able to determine that the fault point occurs on the fiber sensor $S_{22}$ itself. In addition, if fiber sensor $S_{22}$ and fiber sensor $S_{32}$ is broken at same time when using first path 34 to proceed transmission, the sensing spectrum will miss sensor signals of fiber sensor $S_{21}$, fiber sensor $S_{22}$, fiber sensor $S_{31}$ and fiber sensor $S_{32}$. When the system switch to second path 36 to proceed sensing, it will still see that signal from fiber sensor $S_{22}$ and fiber sensor $S_{32}$ is still missing. Thus the sensing system of the present invention can also detect two or more broken sensors.

The fiber sensing system with self-detection mechanism of the present invention utilizes central office to control the secondary ring architecture formed by the fiber sensor, the remote node and the optical coupler primarily. The secondary ring architecture is connected serially to form a primary ring architecture. The central office has a tunable laser light source, the tunable laser light source is first dispersed into multi-light source and delivered to each remote node, then to the fiber sensor through the optical coupler on the remote node. Since the fiber sensor has reflective ability, all light source signal sent by the tunable laser light source will be detected and measured by the fiber sensor. If there is no fault point on the primary ring architecture and the secondary ring architecture, central office can detect all signals reflected by the fiber sensor and produce a spectrum for analyzing fault point locations. Not only does the present invention provides wider-range and multi-point detection, it also greatly reduce the manufacture cost of the optical network.

The embodiments described above are only to exemplify the present invention but not to limit the scope of the present invention. Therefore, any equivalent modification or variation according to the shapes, structures, characteristics and spirits discloses in the present invention is to be also included within the scope of the present invention.

What is claimed is:

1. A fiber sensing system with self-detection mechanism comprising:
   a primary ring architecture, said primary ring architecture including multiple secondary ring architectures connected to a primary loop to be disposed serially therealong, said secondary ring architectures being offset from one another to each independently define a secondary loop, wherein each said secondary ring architecture comprises:
      at least two fiber sensors, operable to receive and reflect a light source signal; and
      a remote node connected to said fiber sensors and including an optical coupler passing the light source signal through said fiber sensors in the secondary loop of said secondary ring architecture; and
   a central office coupled to said primary ring architecture providing said light source signal and a sensing light source signal, said central office including an optical switch, said optical switch having two outputs connected to said primary ring architecture to selectively switch a traveling path of said light source signal in the primary loop between a first path or a second path upon detection of at least one non-responsive fiber sensor connected to the primary loop, said central office thereby detecting a fault located within any of the primary and secondary loops based on the travel of the light source signal through said first and second paths.

2. The fiber sensing system with self-detection mechanism according to claim 1, wherein said central office comprises a tunable laser light source and an optical circulator, said tunable laser light source emitting said light source signal to said optical switch through said optical circulator, said optical switch being actuated to switch path between said first path or said second path.

3. The fiber sensing system with self-detection mechanism according to claim 1, wherein said central office further comprises an optical spectrum analyzer, which connects to said optical circulator.

4. The fiber sensing system with self-detection mechanism according to claim 1, wherein said fiber sensors are of Fiber Bragg Grating (FBG) type.

5. The fiber sensing system with self-detection mechanism according to claim 2, wherein said tunable laser light source is first dispersed into multi-light source and delivered to said remote node, then to said fiber sensor through said optical coupler on said remote node.

6. The fiber sensing system with self-detection mechanism according to claim 1, wherein said fiber sensors have reflective ability, said light source signal sent by said tunable laser light source being detected and measured by said fiber sensors, responsive said primary ring architecture and said secondary ring architecture has no fault point, said central office detecting all signals reflected by said fiber sensors.

7. The fiber sensing system with self-detection mechanism according to claim 1, wherein when said light source signal traveling on said first path encounters fault point on said primary ring architecture, said optical switch automatically switches to said second path for sensing.

8. The fiber sensing system with self-detection mechanism according to claim 7, wherein said central office determines relative location of a fault point based on comparison of responsive fiber sensors in said first path and said second path.

9. The fiber sensing system with self-detection mechanism according to claim 1, wherein when said light source signal traveling on said first path encounters a fault point on said secondary ring architecture, said optical switch automatically switches to said second path for sensing.

10. The fiber sensing system with self-detection mechanism according to claim 9, wherein said central office determines relative location of a fault point based on comparison of responsive fiber sensors in said first path and said second path.

11. The fiber sensing system with self-detection mechanism according to claim 1, wherein when said light source signal traveling on said first path encounters a fault point caused by a defect in one of said fiber sensors, said optical switch automatically switches to said second path for.

12. The fiber sensing system with self-detection mechanism according to claim 11, wherein said central office identifies each defective fiber sensor based on comparison of responsive fiber sensors in said first path and said second path to determine which said fiber sensor(s) is/are broken.

13. The fiber sensing system with self-detection mechanism according to claim 2, wherein said tunable laser light source is a tunable erbium-fiber laser.

* * * * *